United States Patent [19]
Mollon

[11] 3,811,788
[45] May 21, 1974

[54] INSTALLATION OF CARGO HANDLING SYSTEM

[75] Inventor: Leslie Mollon, Southfield, Mich.

[73] Assignee: Brooks & Perkins, Incorporated, Southfield, Mich.

[22] Filed: May 16, 1973

[21] Appl. No.: 360,765

[52] U.S. Cl. ............................... 408/72, 408/241
[51] Int. Cl. ........................................ B23b 47/28
[58] Field of Search ............................. 408/72, 241

[56] References Cited
UNITED STATES PATENTS
3,082,651  3/1963  Patrick, Jr. ........................ 408/72

Primary Examiner—Gil Weidenfeld
Attorney, Agent, or Firm—Whittemore, Hulbert & Belknap

[57] ABSTRACT

A master drill fixture for providing properly related openings in the flooring of an aircraft for the reception of fastening elements to secure a cargo handling system therein. The master drill fixture is composed of a multiplicity of longitudinally extending rigid bars adapted to be assembled together substantially in end-to-end relationship, a multiplicity of transversely extending cross ties, means for locating a predetermined point on the assembled drill fixture in registration with a locating point in the aircraft, and means for aligning and centering the assembled drill fixture with the center line of the aircraft.

9 Claims, 9 Drawing Figures

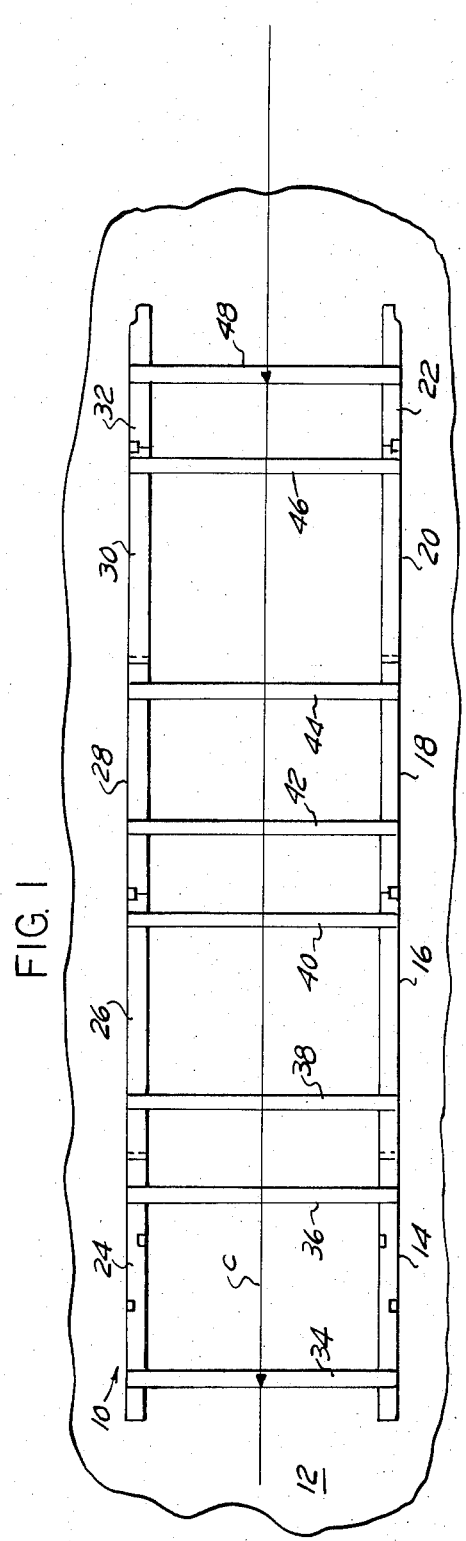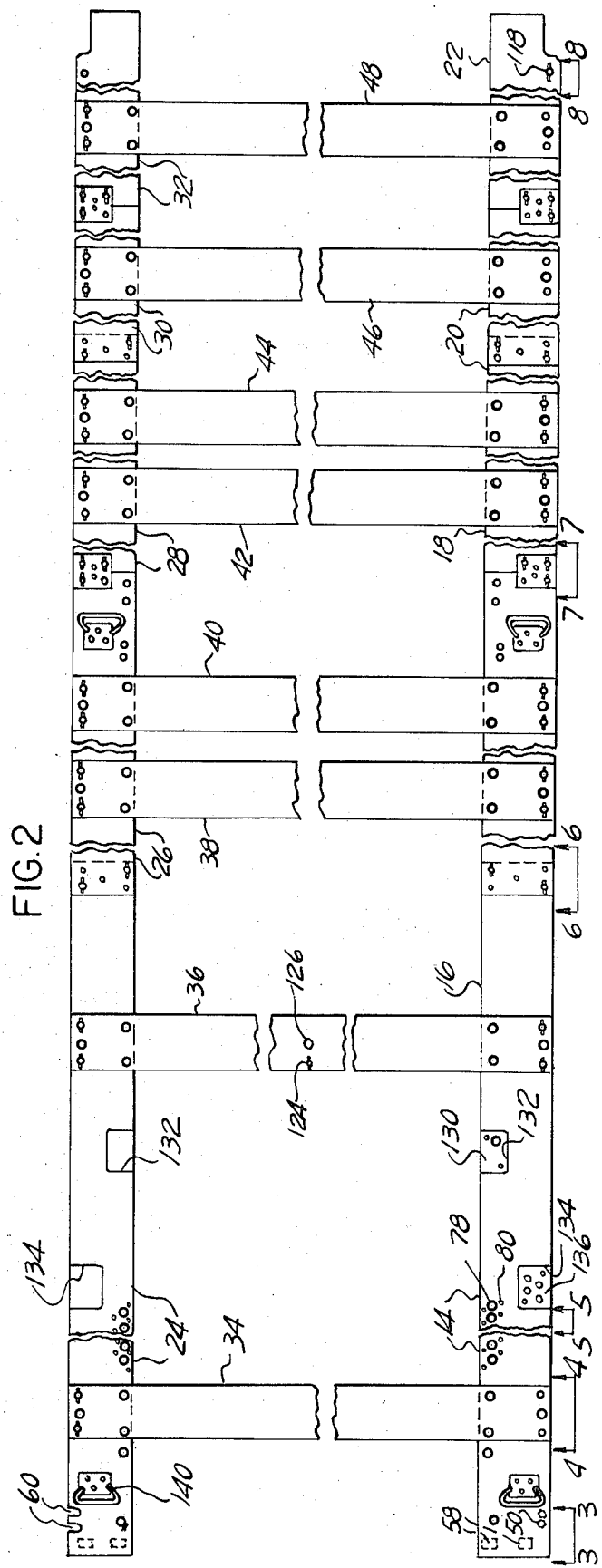

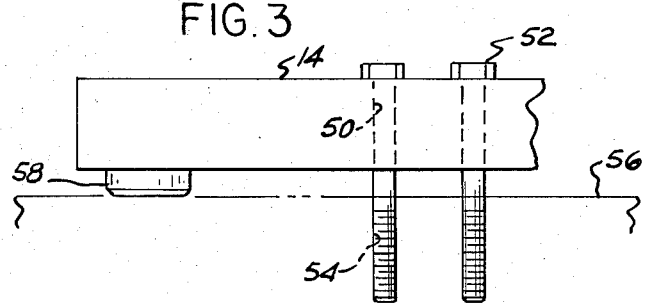
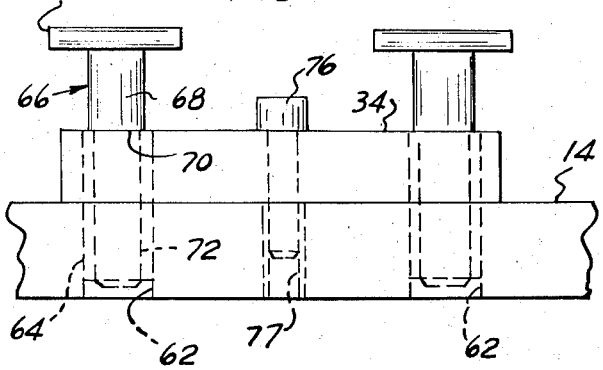
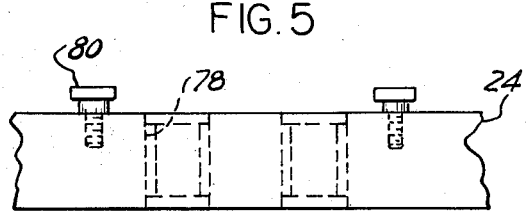
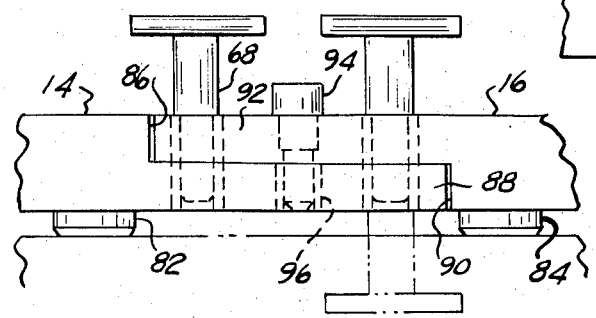
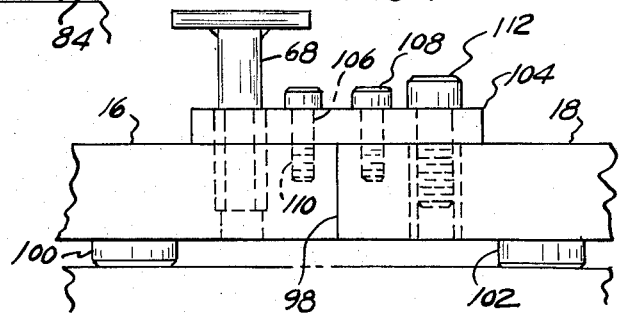
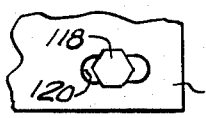
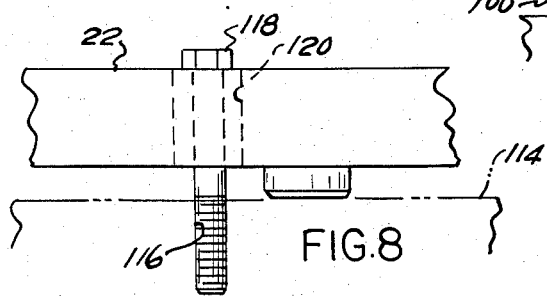

INSTALLATION OF CARGO HANDLING SYSTEM

BRIEF SUMMARY OF THE INVENTION

Cargo handling systems, which may be of the type disclosed in my prior U.S. Pat. No. 3,335,983, are required to be mounted in an aircraft in a definitely fixed location therein and to have fastening elements connected to the cargo handling system make registration with openings received in structurally adequate elements of the aircraft. Since aircraft design is influenced by the requirement for minimum weight, structural elements of the aircraft, or more particularly its frame, are spaced apart. It is accordingly necessary when applying the cargo handling system to insure that the fastening elements make registration with openings provided in structurally adequate elements of the aircraft.

In accordance with the present invention this is accomplished by providing a master drill fixture composed of a multiplicity of elongated elements adapted to be interconnected in end-to-end relationship, generally similar but slightly different elongated elements being provided for assembly spaced equidistant and at opposite sides from the longitudinal center line of the aircraft.

In order for this to be accomplished in an efficient manner, one of the elongated longitudinal elements of the fixture assembly is provided with an opening adapted to register with an opening provided at a predetermined and known locating point in the aircraft. As a result of this, and after the other longitudinal elements have been assembled and interconnected by cross ties with the second set of longitudinally extending elements, all elements of the master drill fixture take a fixed location with reference to the fixed locating point in the aircraft.

The longitudinally extending elongated elements of the drill fixture are provided with one or more sets of openings which constitute locating means for drills. These openings are suitably identified as for example, by color so that a particular color coated set of openings will constitute the means for determining the location of the holes to be drilled for a particular aircraft.

It is essential that the openings be properly located with respect to elements of the aircraft frame capable of supporting the cargo handling system, and that these in turn be accurately related to openings provided in the components of the cargo handling system so that registration between these openings shall be precise. In order to insure the required precision of registration, the components of the master drill fixture after assembly and after proper orientation with respect to the aircraft, are permitted to come to the same temperature as the aircraft so as to avoid errors resulting from dimensional variations due to different temperatures.

Having located a point on the master drill fixture, preferably adjacent one corner thereof, the opposite corner at the corresponding end of the assembly is secured to the aircraft by fastening elements extending through transversely elongated openings. Similarly, at the opposite end of the assembly of elements making up the master drill fixture, the attachment to openings provided in the aircraft is through fastening elements extending through longitudinally elongated openings in the master drill fixture.

A feature of the present invention is the provision of storage recesses in longitudinal components of the drill fixture adapted to receive plates provided with particularly located openings, and the provision of similar recesses in the longitudinal drill fixture elements for receiving different plates so as to provide for differently located sets of openings. The pockets or storage recesses which are machined into the longitudinal fixture element may be provided with enlarged openings or with a multiplicity of openings only some of which are adapted to register with the openings provided in a particular replacement plate.

BRIEF DESCRIPTION OF THE DRAWINGS

FIG. 1 is a more or less diagrammatic view illustrating the assembled master drill fixture.

FIG. 2 is an enlarged plan view of the fixture shown in FIG. 1, with parts broken away.

FIGS. 3–8 are enlarged fragmentary elevational views looking in the directions of the arrows 3—3 to 8—8, FIG. 2.

FIG. 9 is a fragmentary plan view of the structure seen in FIG. 8.

DETAILED DESCRIPTION

Referring first to FIG. 1, the assembled master drill fixture is indicated in its entirety at 10 and is shown in the position in which it occupies within the aircraft, a portion of the floor of which is indicated at 12. In this Figure it is assumed that the forward end of the aircraft is to the left.

Assembled along the left side of a center line C are a plurality of elongated longitudinally fixture frame elements 14, 16, 18, 20 and 22. At the opposite side of the aircraft are corresponding longitudinally aligned extending fixture frame elements 24, 26, 28, 30 and 32. Opposite elements, such for example as 14 and 24 are in general mirror images of each other except for minor differences which will be pointed out.

A number of cross ties 34, 36, 38, 40, 42, 44, 46 and 48 are provided, interconnecting the elongated bar structure at opposite sides of the aircraft.

It will be observed that the frame elements 14 and 24 are interconnected by the cross tie bars 34 and 36. Frame elements 16 and 26 are interconnected by the cross ties 38 and 40. Longitudinally extending frame elements 18 and 28 are interconnected by cross ties 42 and 44. Frame elements 20 and 30 are interconnected by the single cross tie 46, while the rear frame elements 22 and 32 are interconnected by the single cross tie bar 48.

Referring now to FIG. 2 it will be observed that the left front frame element 14 is provided with a pair of openings 50, and as best seen in FIG. 3, the openings 50 receive elongated bolts 52 which extend into openings 54 in a frame element of the aircraft, here designated generally at 56. The two bolts 52 constitute the reference location for the entire master drill fixture.

It will be observed in FIG. 3 that the frame element 14 is spaced upwardly from the upper surface of the aircraft component by the spacer plates 58 the location of which is more readily apparent in FIG. 3.

The frame element 24 is a mirror image of the frame element 14 except that instead of providing circular openings such as 50 for the reception of locating bolts 52, the element 24 is provided with a pair of laterally extending slots 60 which actually open into the outer edge of the element 24. Thus, any variation in spacing between the openings 54 at opposite sides of the center line of the aircraft does not prevent securing the forward end of the frame element 24 in required position.

Referring now to FIG. 4 there is illustrated the manner in which the cross tie or tie bar 34 is employed to interconnect the frame elements 14 and 24. The frame elements 14 and 24 are provided with enlarged openings 62 which receive tubular liners 64 and the parts are retained in position by connector elements 66 which include enlarged portions 68 providing shoulders 70 engageable with the upper surface of cross tie 34 and reduced portions 72 received within the liners 64. To facilitate handling the connector elements 66 they are provided with a cross pin 74 fixedly secured at their upper ends.

The cross tie 34 is attached to the frame element 14 by screws 76 the lower end of which threads into thread forming inserts 77 such for example as those available under the trade name "HELICOIL."

Referring now to FIG. 5 there is illustrated a detail of the master drill fixture frame elements in which the openings 78 constitute in effect a drill bushing and are associated with threaded studs 80 which are located in position to cooperate with a drilling tool and to constitute an abutment to hold a hand held tool against rotation as the drilling is accomplished.

Referring now to FIG. 6 there is shown the connection between the two foremost frame elements 14 and 16. As seen in this Figure, the frame element 14 is provided with a support plate 82 corresponding to the plate 58 shown in FIG. 3, and similar plates 84 are provided adjacent the forward end of the frame element 16.

The rear end of the forward frame element 14 is provided with a recess 86 leaving a rearwardly extending tongue portion 88. Similarly, the forward end of the frame element 16 is provided with a recess 90 leaving an upwardly forwardly extending tongue portion 92. The tongue portion 88 is received in the recess 90 and the tongue portion 92 is received in the recess 86, thus providing an overlapping connection between adjacent ends of the frame elements 16 and 18. Again, the frame elements 14 and 16 are brought into proper registration by insertion of locating pins 68 and the parts are locked in assembled relation by the insertion of locating screws 94, the lower ends of which are threaded and received in suitable thread forming devices 96 such for example as those available under the trade name "HELICOIL."

Referring now to FIG. 7 there is illustrated a different type of connection between adjacent ends of frame elements such as provided for example between frame elements 16 and 18. In this case the ends of frame elements 16 and 18 abut as indicated at 98 and the ends of the two frame elements are elevated by plate legs 100 and 102. The frame elements 16 and 18 are brought into proper position and into alignment with a coupling plate 104 by the insertion of locator pins 68 as previously described. The coupling plate 104 is provided with openings 106 for the reception of assembly screws 108 the lower ends of which are received in threaded recesses 110 provided in the end portions of the frame elements 16 and 18. As indicated in this Figure, locator pins 68 may be removed after they have been used to locate the parts in proper position for assembly, and replaced by assembly screws 112.

Referring now to FIG. 8 there is illustrated the construction at the rear of the rearmost frame element 22. At this point the frame of the aircraft, here designated 114, is provided with an opening 116 for the reception of assembly bolts 118. However, since the forward end of the assembly of left hand frame elements 14, 16, 18, 20, and 22 is positively located, allowance is made for some discrepancy between the length of the frame assembly and the locating opening 116 in the aircraft. This is accomplished by providing an elongated slot 120 through which the assembly bolts 118 pass.

While the entire assembly of the ten longitudinally elongated master drill fixture frame elements, together with the eight cross ties or cross bars illustrated, constitutes a fairly rigid construction, the entire assembly is aligned with respect to the aircraft by marks such as indicated at 124 on the cross ties which are also associated with openings 126 therein with a tensioned wire at the center line as seen at C.

In FIG. 2 there is illustrated a plate 130 which is received in operating position in a recess or pocket 132 provided in the upper surface of the frame element 14. At the opposite edge of the frame element 14 there is provided a similar pocket 134 in which one of the alternately usable apertured plates, here designated 136, may be stored when not in use.

The frame elements 16 are preferably formed of aluminum, and in a specific master drill fixture which has been used, the frame elements have a thickness of 1½ inches and a width of 9'. The length of the individual frame elements varies from 120" for frame elements 14, 16, 24 and 26, to 60" for frame elements 20 and 32.

The cross ties or tie bars in a specific embodiment of the invention have a width of 7 inches, a thickness of 1 inch, and a length of approximately 120 inches.

The construction as thus far described is intended to provide in effect a fixture for drilling holes in the main portion of the aircraft. A similar construction may be provided for preparing the ramp for mounting the appropriate portion of the cargo handling equipment therein.

Conveniently, the individual frame elements may be provided with pivoted handles such as indicated at 140.

What I claim as my invention is:

1. A drill jig for use in drilling holes in an aircraft for assembly of a cargo handling system therein, said jig comprising a plurality of elongated frame elements, said frame element being positionable within the aircarft into two longitudinally extending laterally spaced sub-assemblies and in longitudinal alignment with the ends of adjacent elements fixedly secured together, a plurality of cross ties, means for securing the ends of each cross tie in fixed relation to said longitudinal sub-assemblies, means for attaching a predetermined position on one of said longitudinal sub-assemblies to a known reference point on the floor of the aircraft, and each of said elongated frame elements having a multiplicity of jig openings at predetermined spacings from said predetermined position for locating the sites of holes to be drilled in the floor of the aircraft in relation to the known reference point thereat.

2. A jig as defined in claim 1 in which said frame elements are arranged in matching pairs in which the elements of each pair are of generally identical conformation except that each is a mirror image of the other.

3. A jig as defined in claim 2 in which at least one cross tie connects each pair of elements.

4. A jig as defined in claim 2 in which the means for attaching a predetermined position one one of said elements to a known reference point on the floor of the aircraft comprises a locator opening in the element for the reception of a fastening member engaging in an opening provided in the floor of the aircraft of said reference point.

5. A jig as defined in claim 4 in which said locator opening is adjacent the outer end of the end one of the elongated elements of one of said sub-assemblies.

6. A jig as defined in claim 5 in which at the corresponding end of the corresponding element of the other of said sub-assemblies there is provided a transversely elongated slot for receiving a fastening member for attaching said other sub-assembly to the floor of the aircraft.

7. A jig as defined in claim 5, the outer end of the other end element of said one sub-assembly having a longitudinally elongated opening for the reception of a fastening element adapted to be received in an opening provided in the floor of the aircraft.

8. A jig as defined in claim 1 in which the jig openings are provided with identification so that some of said openings are used on a particular aircraft and others are used on a similar but specifically different aircraft.

9. A jig as defined in claim 8 in which said identification is by color coding.

* * * * *